(No Model.) 2 Sheets—Sheet 1.
H. H. SATER.
SULKY PLOW.
No. 501,607. Patented July 18, 1893.
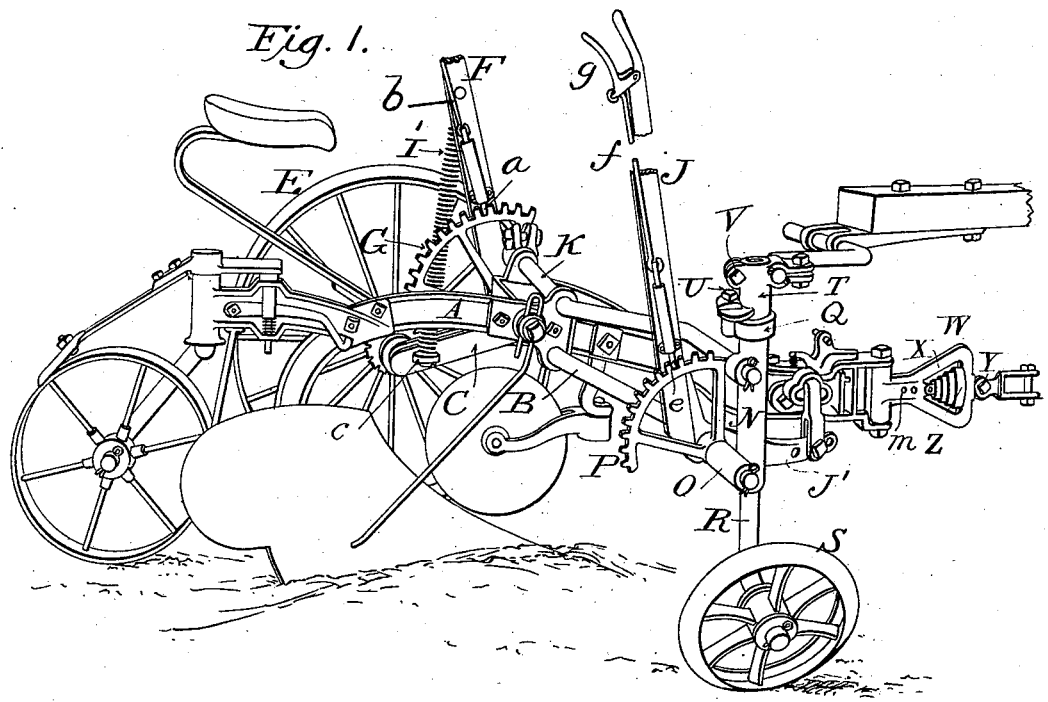
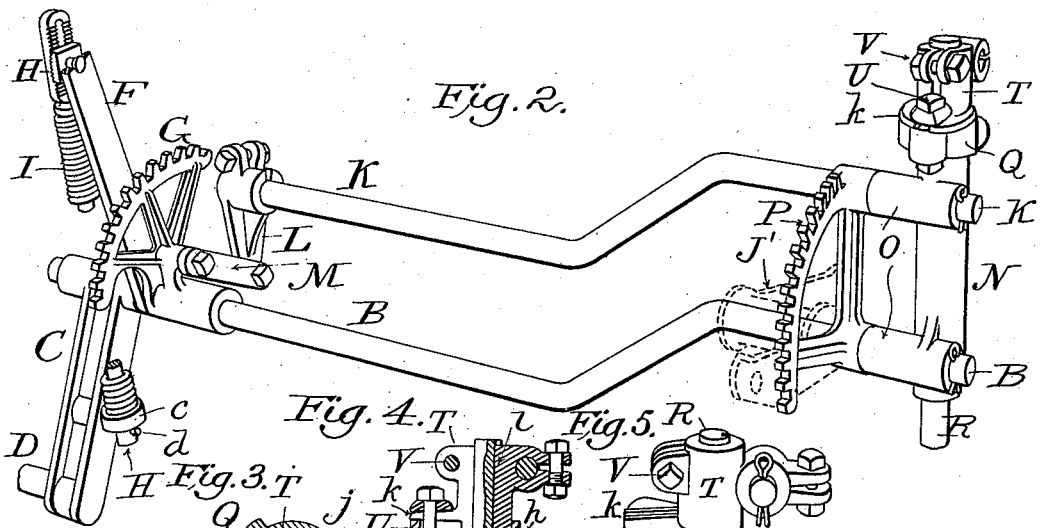
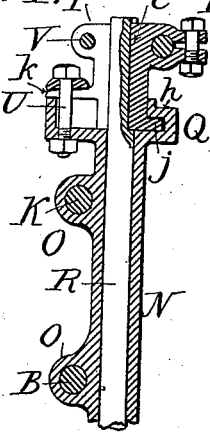
Witnesses:
James F. Duhamel
Horace A. Dodge
HANS H. SATER,
Inventor,
by Dodge & Sons
Attys.

(No Model.) 2 Sheets—Sheet 2.
H. H. SATER.
SULKY PLOW.

No. 501,607. Patented July 18, 1893.

Witnesses
James F. Duhamel.
Horace A. Dodge.

HANS H. SATER,
Inventor,
by Dodge & Sons,
Attys.

UNITED STATES PATENT OFFICE.

HANS H. SATER, OF MADISON, WISCONSIN.

SULKY-PLOW.

SPECIFICATION forming part of Letters Patent No. 501,607, dated July 18, 1893.

Application filed March 14, 1893. Serial No. 465,915. (No model.)

*To all whom it may concern:*

Be it known that I, HANS H. SATER, a citizen of the United States, residing at Madison, in the county of Dane and State of Wisconsin, have invented certain new and useful Improvements in Sulky-Plows, of which the following is a specification.

My invention relates to sulky plows, and consists in various features hereinafter set forth and claimed.

Figure 6:
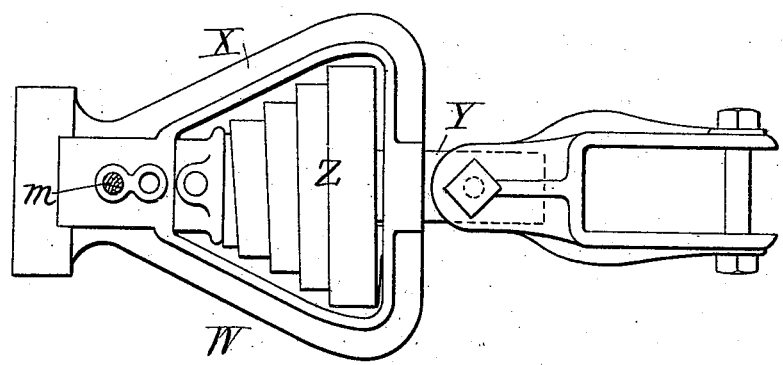
Figure 7:
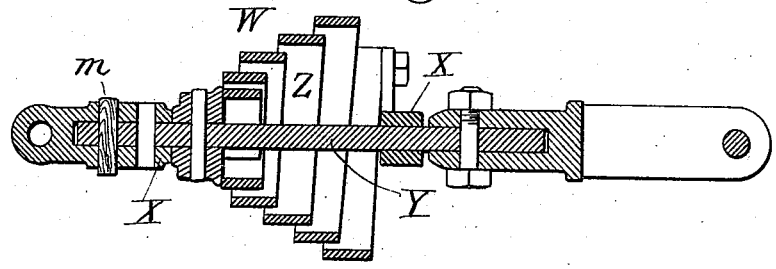

In the drawings,—Figure 1 is a perspective view of my improved plow; Fig. 2, a perspective view illustrating the manner of connecting the axles; Figs. 3, 4, and 5, views illustrating in detail the construction of the sleeve and support for the axle of the furrow wheel; and Figs. 6 and 7, views illustrating the construction of the clevis.

A indicates the main frame which forms no part of the present invention, and which may, therefore, be variously constructed. Journaled in the main frame and extending transversely thereof is the bent axle B. Upon the outer or land end is suspended the swinging arm C,—said arm carrying at its lower end a stud axle D upon which the land wheel E is mounted.

Journaled upon the axle B is a hand lever F which extends upward within reach of the rider, and which is provided with a pawl *a* to engage the curved rack or quadrant G which is affixed to the axle B,—said pawl or dog *a* being designed to be actuated by means of a hand piece (not shown) and a connecting rod *b*.

H indicates a rod which passes at its lower end through the eye *c* attached to the side of arm C, while at its upper end it is secured to the lifting lever F. Between its upper end and the upper face of eye *c*, the rod is encircled by a coiled spring I, while below said eye the rod receives a nut or pin *d* which prevents the lever from rising or being raised without lifting the arm C. It will be noticed, however, that the arm C which carries the wheel may rise slightly, as permitted by the compression of the spring, while the lifting lever is locked in position. By varying the tension of the spring this rising motion of the arm may be controlled.

Above the axle B and substantially parallel therewith is a second axle K which is also journaled in the frame A, said axle K not extending landward as far as the axle B. At its land end this axle K is provided with a radial arm L which is connected by a link M with the quadrant or rack G as shown in Fig. 2.

At the opposite ends, both axles B and K are connected by a vertical sleeve or coupling N which has transverse sockets O O to receive the axles. On that side the coupling nearest the main frame, is a second rack or quadrant P through which the axles also pass,—the lower axle B, however, being coincident with the axis or center of the quadrant.

Mounted upon the axle B adjacent to the inner face of rack P, is a lever J provided with a pawl or dog *e* and its actuating rod *f* and handle *g*,—the lower end of said lever J extending forwardly as at J', Fig. 1, where it is connected to the forward end of the frame or plow beam.

The coupling N is provided at its upper end with a circular socket Q having under cut walls or flanges *h* which are cut away for a limited distance as as *i*, Fig. 5. Mounted in the sleeve or coupling N is a vertical rod or stem R which carries at its lower end the furrow wheel S, and at its upper end a collar T; said collar having a lug or wing *j* which as shown in Figs. 3 and 4, fits within the socket Q. In order to insert the lug, it is brought over the mouth or cut-away portion *i* of the socket Q and dropped down; and is then turned to pass under the flange *h*. After it has been thus inserted and given a partial turn, a bolt U is passed through or between two arms *k k* on the collar, and through the socket Q. The arms *k k* are so arranged with reference to the bolt and the hole in the socket through which the bolt passes, as to allow the collar to turn a limited distance within the socket,—the lug *j* of course remaining in engagement with the under cut flange of the socket Q. This construction forms in effect a swiveled bayonet-joint connection which permits the shaft to turn or rotate a limited distance in its sleeve or coupling, without detachment; and which upon removal of the bolt permits a ready dismemberment of the machine.

It will be noticed upon reference to Figs. 2, 3 and 4, that the collar T is split lengthwise and is clamped to the rod or stem R by means of a bolt V. The upper end of the rod or stem is also slotted to receive a key or feather $l$ (preferably but not necessarily formed integral with the collar) so that while permitting an adjustment of the rod or stem lengthwise through the collar, the two parts will always turn together.

Attached to the plow beam or to the ordinary clevis is the spring break pin clevis W. This clevis comprises an open frame X, through which extends the draw-bar or rod Y, said rod being connected at its inner end with the frame by means of a wooden break pin $m$ which receives the normal strain.

Z indicates a coiled spring which bears at its forward end against the frame X, and is connected at its rear end with the bar or rod Y. When the strain on the pin causes the latter to break, the strain is thrown instantly upon the spring, thus preventing the detaching of the horses or any sudden jar or shock to either machine or horses.

When the two axles B and K are connected by the link M, both sides of the plow will be raised or lowered through or by means of the hand lever J; but when the lever F is actuated, only the left side of the plow will be raised or lowered. By the use of the link the operator may arrange the plow so that both sides may be raised or lowered by lever J; or may so that,—by disconnecting the link,—he raise or lower each side of the plow separately through the levers F and J. Of course operating each side independently by the respective levers F and J takes more time than when both sides are operated simultaneously by lever J (unless the operator actuates both levers at the same time); but on the other hand the work of raising and lowering is rendered easier so that it can be performed without difficulty by a boy. The link has no effect when lever F is actuated, but when connected to the lower axle it causes the latter to move with the upper axle when the lever J is actuated. In other words, the link is disconnected in order that each side of the plow may be raised and lowered independently by the respective levers F and J.

Having thus described my invention, what I claim is—

1. In combination with a main frame, the two axles B and K mounted therein one above the other; a land wheel E carried by or supported from the lower axle; and a furrow-wheel supported from the opposite ends of both axles.

2. In combination with the main frame, the axles B and K mounted therein and rigidly connected at one end; a detachable connection at the opposite end of the axles; a lever F applied to the lower axle B on the land side of the plow; and a lever J on the furrow side of the machine; all substantially as shown, whereby when the link is connected to the two axles the plow may be raised or lowered at both sides simultaneously by lever J, and whereby also when the link is disconnected the plow may be raised or lowered at each side independently by the levers F and J.

3. In combination with the main frame and the two axles B and K; the rack P connecting the axles at one end; a rack G mounted upon the opposite end of axle B; and a link M extending from the rack G to an arm or axle K.

4. In combination with the main frame and the axles B and K; the coupling N; and the furrow wheel rod or stem mounted in the coupling.

5. In combination with the main frame and the axles B and K; the rack P; and the lever J mounted upon the axle B and connected at its lower end to the frame.

6. In combination with the main frame and the axles B and K; the coupling N; and the furrow-wheel-stem R journaled in the coupling, and having a bayonet-joint connection with the sleeve.

7. In combination with the main frame and the axles B and K; the coupling N; the furrow-wheel stem R journaled in the coupling, and a collar adjustable longitudinally upon the stem, and engaging the coupling.

8. In a safety clevis, the combination with the frame X; of the draw-bar; the wooden break-pin $m$; and the coiled spring connected with the draw-bar and adapted to come into action only after the pin breaks.

9. In a clevis, the combination with the frame X; of the draw bar Y; and the pyramidal spring Z bearing at one end against the frame X and at the other end against the draw bar or a lug thereon, the coils of said spring being adapted to fold one within the other.

In witness whereof I hereunto set my hand in the presence of two witnesses.

HANS H. SATER.

Witnesses:
   EDWARD F. APPLEBY,
   W. R. BAGLEY.